(No Model.)
D. M. SMALL.
GAS TEST AND PRESSURE GAGE.
No. 266,543. Patented Oct. 24, 1882.
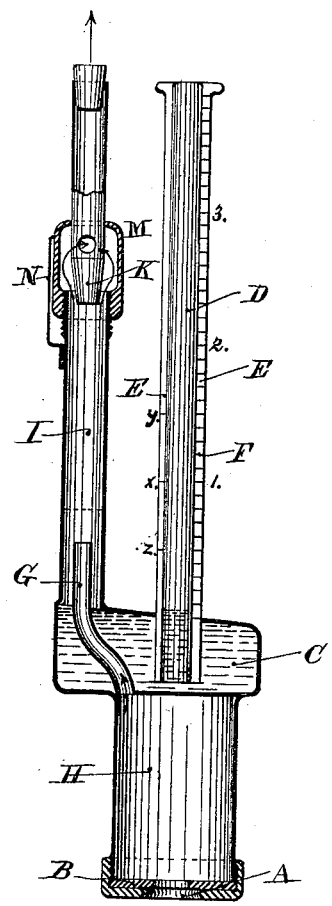
WITNESSES:
Joseph H. Perkins
Hattie A. Wiley
INVENTOR:
Dexter M. Small

UNITED STATES PATENT OFFICE.

DEXTER M. SMALL, OF PROVIDENCE, RHODE ISLAND.

GAS-TEST AND PRESSURE-GAGE.

SPECIFICATION forming part of Letters Patent No. 266,543, dated October 24, 1882.

Application filed March 13, 1882. (No model.)

*To all whom it may concern:*

Be it known that I, DEXTER M. SMALL, of Providence, county of Providence, and State of Rhode Island, have invented a new and useful Improvement in Gas-Burners and Pressure-Gages for Testing the Capacity of Burners, as follows:

The accompanying drawing is a vertical section of the same, showing all of its parts.

It is similar to my other meters or gages, in that it has an aperture, A, in the base, with a rubber socket, B, which fits closely around the burner to be tested.

C is a well filled with liquid; D, a glass tube, partly incased in a metal tube, E E, for protection, upon which is marked a graduated scale, F, the same as on ordinary pressure-gages; G, a small tube through which the gas passes from the chamber H to the outlet-tube I, in which is a valve, K.

In operation the instrument is pressed down over the burner, and the gas then turned on. The valve K being closed, the pressure of the gas forces the liquid in the well C up into the tube D, thus showing the pressure which I have found it necessary to ascertain in each case before the capacity of the burner can be accurately ascertained, as hereinafter described. Now, it is obvious that equal quantities of gas of the same density and under the same pressure will always pass through a given aperture in the same time or at the same rate.

The scale at M, connected with valve K, is made by connecting the instrument with a standard gas meter or holder, (the same as with a burner,) in which gas of a given density is maintained at a constant pressure, and marking on the scale M the points to which the valve has to be opened to let through the different quantities of gas ascertained, keeping the level of the liquid in the tube D always at the same point. (Any point would do; but one inch is as good as any.) After the scale M has been made, the pressure of the gas in the holder having been kept, we will say, at two inches, we then increase the pressure therein to three inches, ascertain when one foot of gas per hour is passing, again connect the instrument therewith, set the valve so as to indicate on the scale M one foot, and mark the point to which the liquid rises in the tube D when one foot of gas is passing under this extra pressure, and so on for the different pressures. (The same point in each case answers for the entire scale at M.) In actual practice it is only essential to ascertain the points for the one, two, and three inch pressures, which, on the tube E, I have marked $x\ y\ z$.

To test a burner, then, we first ascertain the pressure of the gas thereat, as above stated, then gradually open the valve K until the liquid in the tube D descends to the point which corresponds to the pressure as ascertained. The point on the scale M to which the hand N then points indicates the rate at which gas is passing.

By cutting off and closing the outlet-tube at the dotted line just above the little tube G, the instrument becomes simply a pressure-gage, and makes a very convenient one.

I claim as my invention—

1. The combination, in an instrument for ascertaining the capacity of gas-burners, of an adjustable outlet, in connection with a graduated scale and a suitably-graduated pressure-gage, substantially as described, and for the purpose set forth.

2. The combination, in a gas-pressure gage, of an enlarged well above the base H for holding liquid, with a transparent tube extending perpendicularly above and down into the liquid, and a suitable passage for the gas from the base H to a point above the liquid in the well, all arranged and operating substantially as described.

3. In a gas-burner gage, the chamber H, well C, and tubes D and G, together with an adjustable outlet, in connection with a graduated scale, arranged to operate substantially as described.

4. In a gas-gage of the class described, the combination, with a graduated outlet, of a scale of the nature described and designated as $x\ y\ z$, in accordance with which the size of the outlet is to be varied, as and for the purpose set forth.

5. In a gas-burner gage, a compound scale indicating the corresponding pressures when the outlet is closed and when it is opened, so as to permit the gas to flow at a predetermined rate.

DEXTER M. SMALL.

Witnesses:
JOS. H. PERKINS,
HATTIE A. WILEY.